United States Patent [19]

Owen

[11] Patent Number: 4,926,698

[45] Date of Patent: May 22, 1990

[54] DUAL WEDGE FLOW ELEMENT

[75] Inventor: Raymond E. Owen, Rochester, N.Y.

[73] Assignee: Process Automation Business, Inc., Columbus, Ohio

[21] Appl. No.: 318,696

[22] Filed: Mar. 3, 1989

[51] Int. Cl.$^5$ .................................................. G01F 1/42
[52] U.S. Cl. ................................. 73/861.61; 73/861.63
[58] Field of Search ........... 73/861.52, 861.61, 861.62, 73/861.63, 861.64

[56] References Cited

U.S. PATENT DOCUMENTS

| | | |
|---|---|---|
| 1,480,661 | 1/1924 | Brown . |
| 1,706,145 | 3/1929 | Collins . |
| 2,044,806 | 6/1936 | Naiman . |
| 2,842,962 | 7/1958 | Dall . |
| 3,521,487 | 7/1970 | Akeley . |
| 3,910,113 | 10/1975 | Brown . |
| 3,998,097 | 12/1976 | Akashi et al. . |
| 4,047,521 | 9/1977 | Kramer et al. ................ 73/861.65 |
| 4,237,739 | 12/1980 | Owen et al. . |

FOREIGN PATENT DOCUMENTS 508345  9/1928 Fed. Rep. of Germany .
1071361 12/1954 Fed. Rep. of Germany .

OTHER PUBLICATIONS

Process Automation Business, Inc. Brochure, PDS-52G001-1985-pp. 13-15.
Taylor Instrument/Combustion Engineering, Inc. Brochure, 98325-2-1987-two-sided (1 p.).

Primary Examiner—Herbert Goldstein
Attorney, Agent, or Firm—Chilton, Alix & Van Kirk

[57] ABSTRACT

A body (12) containing a substantially cylindrical bore (14) as fluidly connected in a straight pipe run, the bore having opposed relatively upper and relatively lower wall portions (94,96) and opposed side wall portions. A pair of substantially solid wedge members (30,32) are detachably secured to the side wall portions and project toward the bore axis (34), partially blocking the flow of fluid through the bore to produce a differential pressure upstream and downstream of the wedge members. Sensors (64,66,68,70) are provided upstream and downstream of the wedge members, through the side walls of the bore, to obtain differential pressure measurements from which the fluid flow rate can be computed.

12 Claims, 3 Drawing Sheets

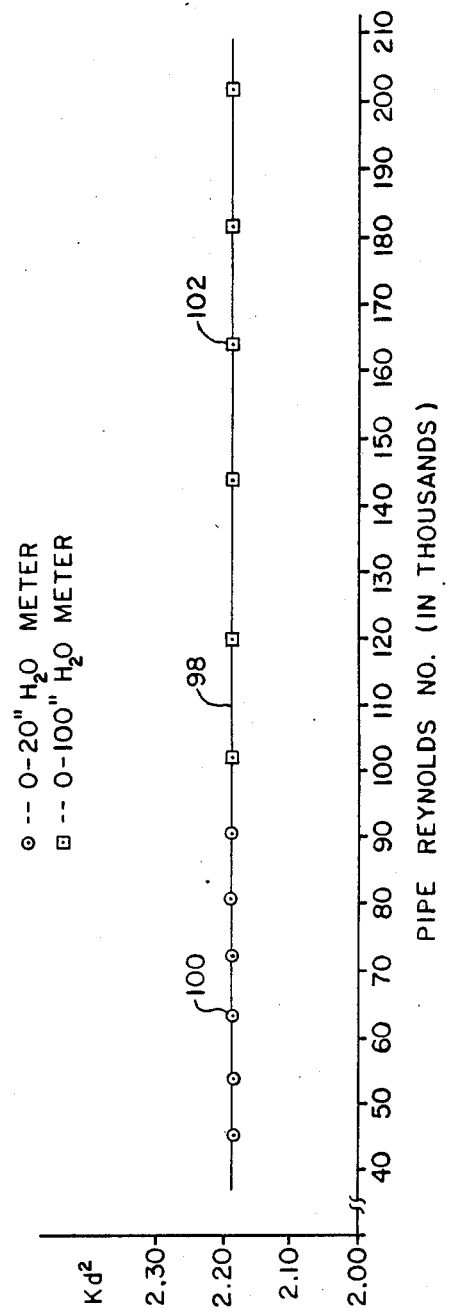

4,926,698

DUAL WEDGE FLOW ELEMENT

BACKGROUND OF THE INVENTION

The present invention relates to measuring the flow of a material through a flow line in which the bore is substantially uniform in cross-section except that one portion is of lesser cross-section and so acts as a flow restriction. As is well known, such restriction causes different pressures to exist in the material, whereby the flow rate of the material can be inferred from measurement of the pressure difference.

A variety of flow measurement techniques are known in the prior art, including the use of nozzles, venturis, orifices, vortexes, wedge-type restrictors and magnetic techniques. These techniques have associated advantages and disadvantages. Except for the magnetic flow meter, all of these techniques operate by producing a differential pressure which is a function of the flow rate. Among the differential pressure measuring elements, the wedge element retains a constant flow coefficient, $Kd^2$ over a much larger range of pipe Reynolds number, particularly at low Reynolds numbers, relative to the other types of elements. This is an important advantage to the wedge-type element, in that it gives a reliable measure of flow rate to lower flows than the other restrictor-type elements.

U.S. Pat. No. 4,237,739, "Integral Flow Metering Assembly Using a Segmental Wedge", describes a commercially successful wedge-type flow measuring device that is installed in a pipe run. A one-piece rigid body has a cylindrical bore with a segmental wedge projecting therein. A differential pressure transmitter or the like, is mounted to sense the pressure developed on either side of the wedge in response to flow.

As fluid flows through the wedge restriction, the fluid velocity increases, resulting in a differential pressure across the pressure taps. The magnitude of the differential pressure is proportional to the volume flow rate by the square root law. At zero flow the differential is zero. As flow increases, the differential increases by the square of the flow rate. This relationship between flow and differential pressure prevails over a wide range of pipe Reynolds numbers, but deteriorates somewhat at low Reynolds numbers. Typically, with the wedge meter of the type shown in the +739 patent, the flow coefficient, $Kd^2$, begins to deviate by more than 5% from theoretical, at Reynolds numbers under about 500.

SUMMARY OF THE INVENTION

It is thus an object of the present invention to improve upon the known wedge-type flow measuring device, by extending the range of accuracy below pipe Reynolds numbers of about 500.

It is a further object to improve upon the known wedge-type flow measuring device by maintaining a more uniform or symmetric fluid velocity profile in the vicinity of the wedge element.

This object is accomplished with the present invention, by providing a flow metering device comprising a body having a flow bore passing through first and second ends thereof, the ends being connectable to first and second flow lines, respectively. Two substantially solid wedge members are located in the bore symmetrically about the bore axis, each wedge member having respective first and second surfaces oriented obliquely to the bore axis and generally facing the respective first and second ends of the flow bore. Pressure taps and associated sensors are located on either side of the wedge members, to obtain a differential pressure signal for determining the flow rate.

The invention is particularly well suited for measuring the flow rate in fluids containing solids and entrained gases. Preferably, when used for measuring these types of fluids, the flow measuring element is connected in a fluid pipeline having a straight run that is oriented non-vertically, i.e., preferably horizontally. The wedge members are oriented laterally within the cylindrical bore of the device, whereby unobstructed portions of the bore are located at the vertically upper and lower portions of the bore. Thus, with the top and bottom of the bore fully open, extraneous fluids such as air and liquid, or condensates and vapor, or solids and liquids, can freely pass through the restriction between the wedge members.

By providing the pressure taps on the sides of the bore, in alignment with the wedge members, more accurate pressure readings are available because anomalies which may occur in the flow, are more likely to occur at the vertically upper and lower regions of the flow. Thus, the present invention not only produces a more consistent velocity profile than a single wedge, but to the extent such velocity profiles are irregular, they occur in locations more remote from the pressure sensors. This can be particularly important when measuring slurry flows where the solid particles are lighter than the liquid, such as paper stock.

Relative to the known single wedge designs, the present invention provides a more constant flow coefficient over a wider range of Reynolds numbers, typically remaining within 1% of the uniform flow coefficient, down to Reynolds numbers of about 100. The dual wedge design allows for maintaining accuracy at both lower and higher flow rates for a given pipe size, relative to the single wedge design and other flow restriction type measuring devices. The dual wedge design also results in a lower permanent pressure loss than with the single wedge design. The present invention also reduces wear on the bore wall on the downstream side of the wedge member, since flow is restricted more symmetrically, and therefore not directed against one side wall, as in the single wedge design. With the dual wedge design, the advantage of the single wedge whereby flow can be measured in either direction, is fully retained.

BRIEF DESCRIPTION OF THE DRAWINGS

These and other objects and advantages of the invention will be described below with reference to the accompanying drawings, in which:

FIG. 5 is a graphic representation of the performance characteristics of the invention for a two-inch pipe size calibrated with two transmitters.

DESCRIPTION OF THE PREFERRED EMBODIMENT

Figure 1:
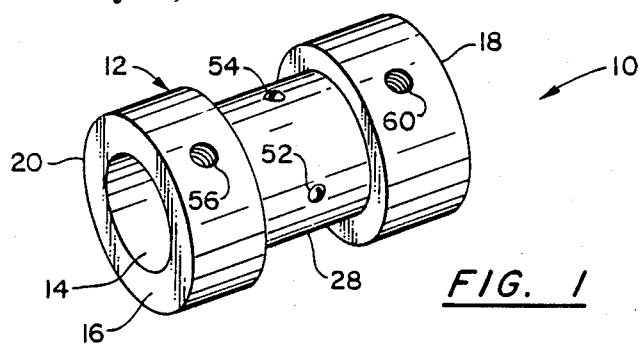
FIG. 1 is a perspective view of a flow measuring device in accordance with the present invention.

FIGS. 1–4 illustrate the preferred embodiment of the invention. The flow measuring device 10 has a unitary body 12 with a cylindrical flow bore 14 passing through first and second ends 16,18 of the body. Structure such as external flanges 20,22 (or threads at the bore ends, not shown) are provided for fluidly connecting the device 10 to respective ends of first and second fluid flow lines 24,26.

Within the cylindrical, central portion 28 of the body 12, are situated two substantially solid wedge members 30,32 projecting symmetrically toward the bore axis 34. Each wedge member 30,32 has a first surface 36,38 oriented obliquely to the bore axis and generally facing the first end 16 of the body. Similarly, each wedge member has a second surface 40,42 oriented obliquely to the bore axis and generally facing the second end 18 of the body. The first and second surfaces of each wedge member 30,32, form respective apex edges 44,46, which are spaced from and oriented substantially perpendicularly to the bore axis 34.

Figure 4:
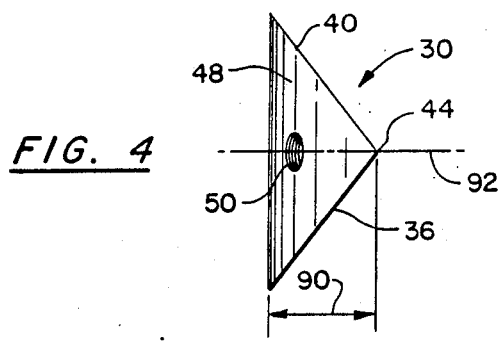
FIG. 4 is an enlarged detailed view of one wedge member.

Each wedge member 30,32 is preferably detachably connected to the inner wall of the bore 14 in the central portion 28. As shown in FIG. 4, a given wedge member 30 has a curved peripheral surface 48 opposite the apex edge 44, which conforms to the cylindrical inner wall of the bore 14. One or two tapped holes 50 are located on the peripheral surface 48, for registry with respective holes 52,54 in the wall of the central portion 28 of the body 12.

Preferably, each wedge member 30,32, has associated therewith respective pressure taps 56,58 which penetrate the bore wall at locations between the wedge first surfaces 36,38 and the first end 16 of the body 12, and taps 60,62 which penetrate the bore between wedge second surfaces 40,42 and the second end 18 of the body. The taps 56,58 have associated therewith pressure sensors 64,66, and taps 60,62 has associated therewith pressure sensors 68,70.

Figure 2:
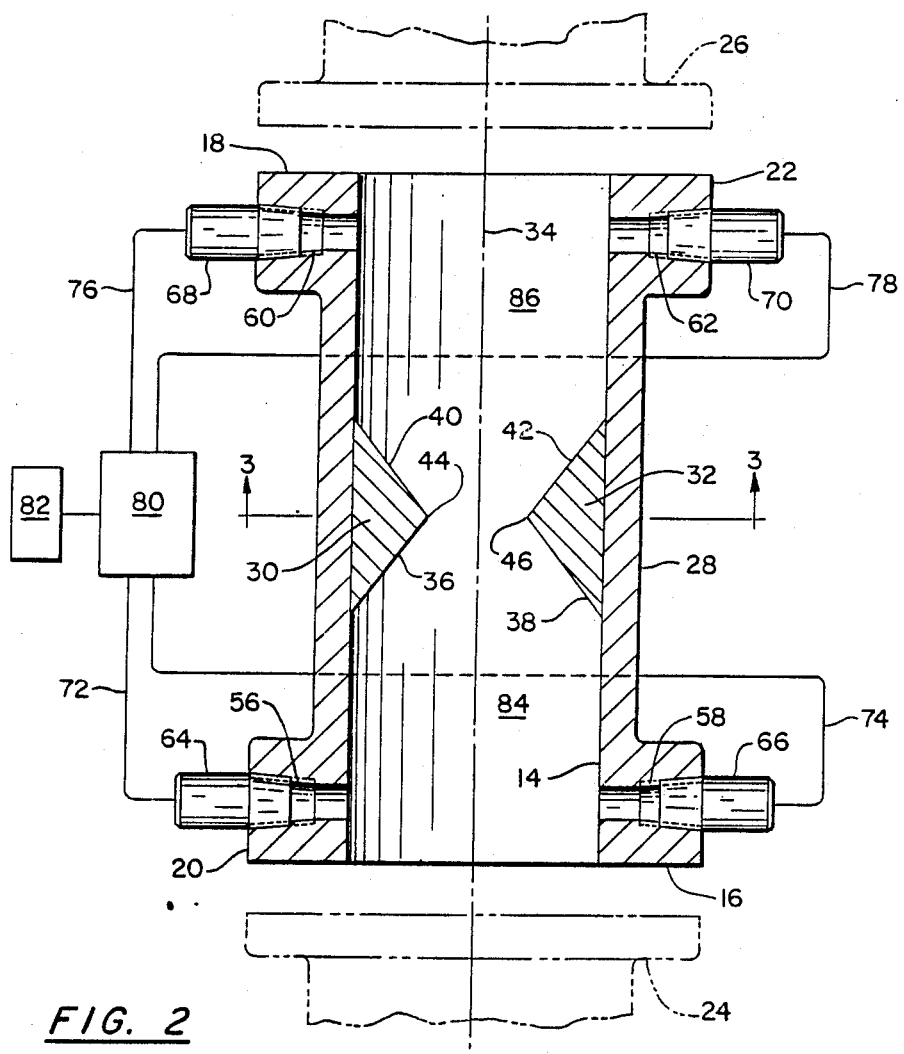
FIG. 2 is a longitudinal section view of the device shown in FIG. 1, and in schematic form, an associated sensor and display circuit.
Figure 3:
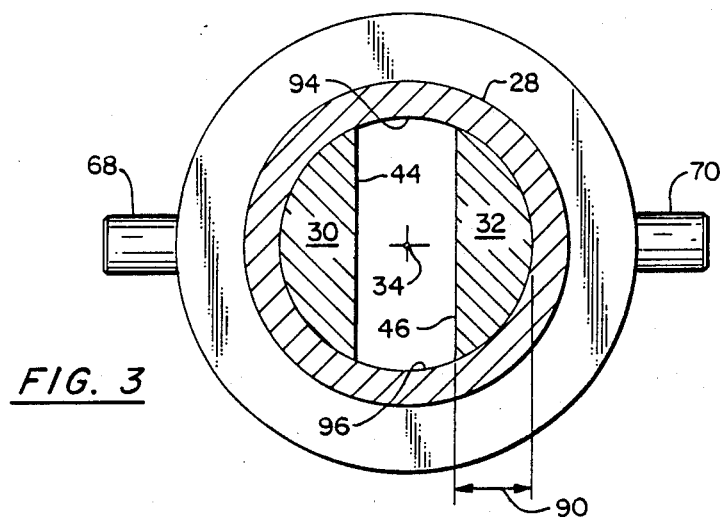
FIG. 3 is a cross-section view through line 3—3 of FIG. 2.

It should be appreciated that the invention can be implemented with only one sensor on one side of the wedge members, and only one sensor on the other side of the wedge members, since this arrangement will generate a satisfactory differential pressure measurement. It is preferred, however, that four sensors be utilized as shown in FIG. 2, to improve accuracy. Thus, in a preferred embodiment, the sensors 64,66,68,70 have associated therewith signal lines 72,74,76,78, which are connected to a processor 80. The processor 80 utilizes the sensor signals by summing the signals from lines 72 and 74 and computing the difference relative to the sum of the signals from lines 76 and 78. Alternatively, the pressure difference between the signals on lines 72 and 76, and pressure difference between signals on lines 74 and 78, can be computed and the resulting two independently determined flow rates recorded or displayed in a display device 82, both separately and as averaged.

It should be appreciated that the dual wedge device 10 can measure flow in either direction, i.e., the flow can be characterized by a relatively high pressure in region 84 on the first sides 36,38 of the wedge members 30,32, and a relatively low pressure in region 86 on the second sides of the wedge members or, the high pressure can exist in region 86 and the low pressure in region 84. This differential pressure is a result of the flow passing through the restricted region 88, defined by the open cross-sectional area between the apexes 44,46 of the wedge members, transverse to the axis 34.

Regardless of the flow direction, it should be appreciated that the flow velocities and flow streams on either side of the axis 34, as viewed in FIG. 2, are substantially symmetrical. Moreover, due to the symmetric projection of the wedge members 30,32, relative to axis 34, the flow deflection due to one wedge member is counterbalanced by the flow deflection due to the other wedge member, so that the fluid passing through the restriction 88 is not thrown against the wall of the bore to the extent occurring in the single wedge, or other asymmetric designs.

The size of each wedge member 30,32 can depend on the type of fluid to be measured. The detachability of the wedge members permits interchangeability and thus adaption to different fluids or flow conditions. By analogy to a parameter referring to the effective opening through the restriction, used with respect to other flow restricting devices, the parameter R is defined as the ratio of the combined heights 90 of the two wedge members 30,32, to the diameter of the bore. The wedge height 90 is taken as the minimum distance from the apex edge 44 to the peripheral surface 48 of the wedge, i.e., to the bore wall, in a direction 92 perpendicular to the bore axis. The useful range of the parameter R with the present invention is within the ratios of about 0.4 to 0.8.

The device 10 in accordance with the invention is particularly effective for measuring flow rates in fluids having non-uniformity such as entrained solids or gases. For optimum performance, the body 12 of the device 10 is secured in series with lines 24 and 26 in a straight pipe run that is oriented non-vertically, preferably horizontally, thereby defining a vertical direction transverse to the flow axis 34. The device 10 is installed so that the pair of wedge members 30,32 project laterally toward the bore axis 34 from the side walls of the bore 14. This arrangement of the wedge members results in the apex edges 44,46 being arranged vertically and in parallel (when the flow axis 34 is horizontal), and leaves the upper and lower surfaces 94,96 of the bore wall open and unobstructed. Entrained solids or gases, or the like, will preferentially flow through the restriction 88 along the unobstructed openings 94,96. Any anamolous effects on pressure readings due to these inclusions in the flow, are eliminated by locating the pressure taps 56,58,60,62 laterally of the bore, such that taps 56 and 60 penetrate the wall along an imaginary line passing through the peripheral portion of wedge member 30, and taps 58 and 62 along an imaginary line passing through the peripheral portion of the other wedge member 32. These lines preferably intersect the wedge height line 92. Preferably, the taps 56,58,60,62 penetrate the wall along the line passing perpendicularly through the bore axis.

Figure 6:
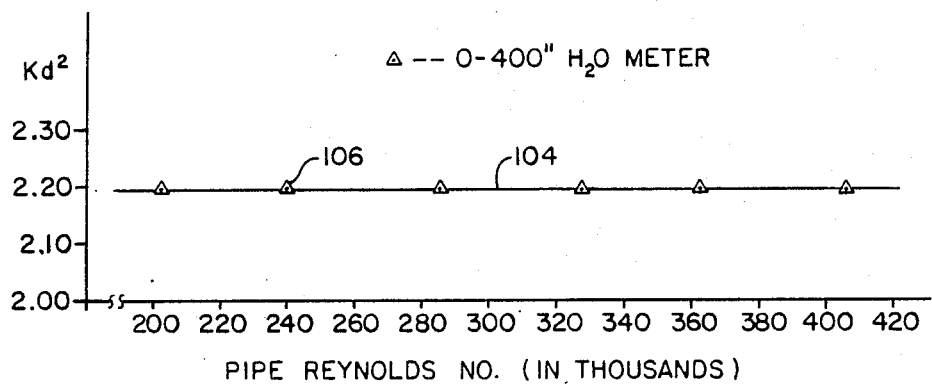
FIG. 6 is a graphic representation of the performance characteristics of the invention for a two-inch pipe size calibrated with a 0–400" H₂O transmitter.

FIGS. 5 and 6 show graphically the performance characteristics of the invention as tested under laboratory conditions. These figures show the effective flow constant $Kd^2$ where d is the equivalent orifice diameter, as a function of pipe Reynolds number. In FIG. 5, the data points on curve 98 represented by circles 100 are for a flow meter calibrated with a differential pressure transmitter having a range of 0–20 inches of water pressure, whereas the rectangles 102 represent meters calibrated with 0–100 inches of water pressure. It can be seen that the flow constant is substantially uniform over the indicated range of pipe Reynolds number. The curve 104 for data points 106 of FIG. 6 represents the flow constant as a function of pipe Reynolds number for a differential pressure transmitter in the range of 0–400 inches of water. All three of the sets of data for the dual wedge meter were taken for the effective ratios R as defined above, of 0.7.

The following table provides a summary comparison of the performance of the dual wedge of the present invention, with a single wedge as known in the prior art.

| TABLE OF PERFORMANCE COMPARISON | | |
|---|---|---|
| | Dual Wedge | Single Wedge |
| Accuracy | 0.35% | 0.5% |
| Noise Level | 1.3% of max diff | 2.1% of max diff |
| Low $R_D$ Number for constant $Kd^2$ | down to 140 $R_D$ | down to 600 $R_D$ |
| % Pressure Loss | 70 to 81% of diff | 51 to 90% of diff |
| Actual Press Loss | 14" $H_2O$ | 21" $H_2O$ |

Although the dual wedge had a higher percent of differential loss, its actual loss was less when converted to inches of water.

Thus, it is should be appreciated that the present invention is relatively simple to manufacture and install, yet provides significant improvements over known devices. The scope of the invention sought to be protected is not limited by the details of the preferred embodiment described herein, but rather by the claims appended hereto.

I claim:

1. A liquid flow metering device comprising:
a body having a cylindrical wall defining a flow bore passing through first and second ends thereof;
means for connecting the first and second ends of the body to first and second cylindrical liquid impulse lines, respectively;
two substantially solid wedge members located in the bore symmetrically about the bore axis, each wedge member having a first surface oriented obliquely to the bore axis and generally facing the first end of the body, and a second surface oriented obliquely to the bore axis and generally facing the second end of the body, the first and second surfaces of each wedge member forming an apex edge that is spaced from and oriented substantially perpendicularly to the bore axis, each of the wedges having a peripheral surface opposite the apex edge, which conforms to and is selectively detachable from the wall;
first sensor means, for sensing the fluid pressure at a first location within the bore between one of said first surfaces and the first end of the body; second sensor means, for sensing the fluid pressure at a second location within the bore between one of said second surfaces and the second end of the body;
whereby the fluid flow rate through the bore can be determined from the sensed pressures at the first and second locations.

2. A flow metering device comprising:
a body having a flow bore passing through first and second ends thereof;
means for connecting the first and second ends of the body to first and second fluid impulse lines, respectively;
two substantially solid wedge members located in the bore symmetrically about the bore axis, each wedge member having a first surface oriented obliquely to the bore axis and generally facing the first end of the body, and a second surface oriented obliquely to the bore axis and generally facing the second end of the body, the first and second surfaces of each wedge member forming an apex edge that is spaced from and oriented substantially perpendicularly to the bore axis;
first sensor means, for sensing the fluid pressure at a first location within the bore between one of said first surfaces and the first end of the body;
second sensor means, for sensing the fluid pressure at a second location within the bore between one of said second surfaces and the second end of the body;
third sensor means, for sensing the fluid pressure at a third location within the bore between the other of said first surfaces and the first end of the body;
fourth sensor means, for sensing the fluid pressure at a fourth location within the bore between the other of said second surfaces and the second end of the body;
means coupled to the first and third sensor means for generating at least one first signal indicative of fluid pressure between the wedge members and the first end of the bore;
means coupled to the second and fourth sensors for generating at least one second signal indicative of the fluid pressure between the wedge members and the second end of the bore; and
means responsive to the first and second generated signals, for indicating the fluid flow rate through the bore.

3. The flow metering device of claim 2, wherein
the bore is defined by a cylindrical wall, and
each of said wedges has a peripheral portion opposite the apex edge, which rigidly conforms to the wall.

4. The flow metering device of claim 3, wherein,
the minimum distance from the apex edge to the wall perpendicular to the bore axis defines the wedge height, and
the ratio of the combined heights of the wedge members to the diameter of the bore, is in the range of about 0.8 to 0.4.

5. The flow metering device of claim 3, wherein the first and second sensor means penetrate the wall along a common imaginary line passing through the peripheral portion of the same one of said wedge member.

6. The flow metering device of claim 5, wherein the third and fourth sensor means penetrate the wall along another common imaginary line passing through the peripheral portion of the other of said wedge member.

7. The flow metering device of claim 5, wherein the first and third sensor means penetrate the wall along a common imaginary line passing perpendicularly through the bore axis, and the second and fourth sensor means penetrate the wall through another common imaginary line passing perpendicularly through the bore axis.

8. The flow metering device of claim 7, wherein said lines passing through the peripheral portions of the wedge member, are intersected by extensions of the respective wedges heights.

9. A device for metering liquid flow through a pipeline having a straight run that is oriented nonvertically, comprising;

a body containing a substantially uniform cylindrical bore fluidly connected in series within said straight run, the bore having opposed relatively upper and relatively lower wall portions and opposed side wall portions;

a pair of substantially solid wedge members projecting toward the bore axis from the side wall portions and partially blocking the flow of fluid through the bore to produce a differential pressure upstream and downstream of the wedge members; and means situated in the side walls upstream and downstream of the wedge members and responsive to the differential fluid pressure in the bore, for inferring the fluid flow rate through the bore.

10. The device of claim 9, wherein each wedge member has a projecting edge that extends between the relatively upper and relatively lower wall portions of the bore.

11. The device of claim 10, wherein the wedge members are identically shaped and symmetrically located relative to the bore axis.

12. The device of claim 11, wherein said means for inferring differential pressure penetrate the bore at said side wall portions.

* * * * *